United States Patent [19]

Heyes

[11] Patent Number: 4,980,210

[45] Date of Patent: Dec. 25, 1990

[54] LAMINATES OF POLYOLEFIN-BASED FILM AND METAL AND PROCESSES FOR PRODUCING SUCH LAMINATES

[75] Inventor: Peter J. Heyes, Wantage, England

[73] Assignee: CMB Foodcan plc, Worcester, United Kingdom

[21] Appl. No.: 377,828

[22] PCT Filed: Oct. 12, 1988

[86] PCT No.: PCT/GB88/00857

§ 371 Date: Jun. 9, 1989

§ 102(e) Date: Jun. 9, 1989

[87] PCT Pub. No.: WO89/03308

PCT Pub. Date: Apr. 20, 1989

[30] Foreign Application Priority Data

Oct. 15, 1987 [GB] United Kingdom ................. 8724243

[51] Int. Cl.[5] ....................... B32B 15/08; B32B 31/26; B32B 5/16

[52] U.S. Cl. .................................. 428/35.9; 156/321; 156/327; 428/36.4; 428/331; 428/461; 428/475.8; 428/516

[58] Field of Search ..................... 428/331, 461, 475.8, 428/516, 35.9, 36.4; 156/321, 327

[56] References Cited

U.S. PATENT DOCUMENTS 4,358,493 11/1982 Ohtsuki et al. ..................... 428/35.9
4,451,506 5/1984 Kobayashi et al. ................. 428/461
4,695,492 9/1987 Godar ............................... 428/35.9

FOREIGN PATENT DOCUMENTS 0031701 7/1981 European Pat. Off. .
0035392 9/1981 European Pat. Off. .
0062385 10/1982 European Pat. Off. .

*Primary Examiner*—James Seidleck

*Attorney, Agent, or Firm*—Burns, Boane, Swecker & Mathis

[57] ABSTRACT

In a laminated material comprising a polyolefin-based film bonded to a metal sheet (M), the polyolefin-based film is a multi-layer co-extruded film comprising an inner layer (B2) of a bonding resin which is an acid-modified polyolefin resin containing carboxyl or anhydride groups and an outer layer (B1) of a polyolefin or polyamide containing 0.15% to 0.5% by weight of a finely divided non-reactive low-opacity synthetic silica having an average particle size on the range 0.5 to 5 microns. Another thermoplastic film (A1,A2), such as a biaxially oriented polyester film, may be simultaneously laminated to the other surface of the metal sheet. The lamination process involves heating the laminated material to effect bonding and then quenching the laminated material rapidly and uniformly from above the melting point of the polyolefin to below its softening point. The laminated material may be used in the formation of can ends and can bodies, which can be double seamed together without fibrillation of the polyolefin-based coating.

23 Claims, 2 Drawing Sheets

B2
B1
M
A1
A2

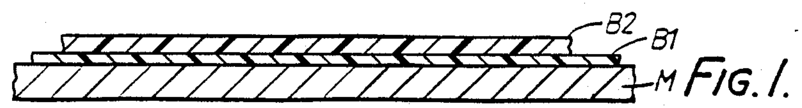
FIG. 1.
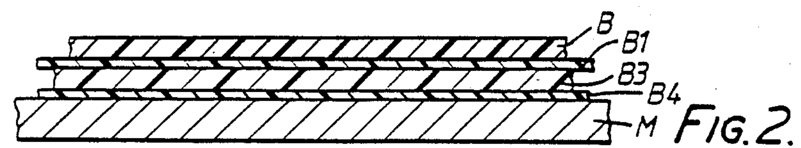
FIG. 2.
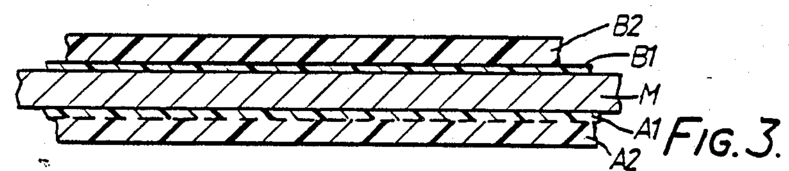
FIG. 3.
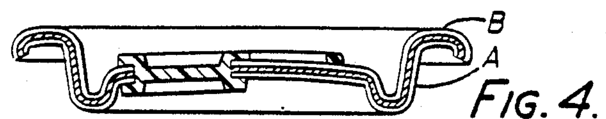
FIG. 4.
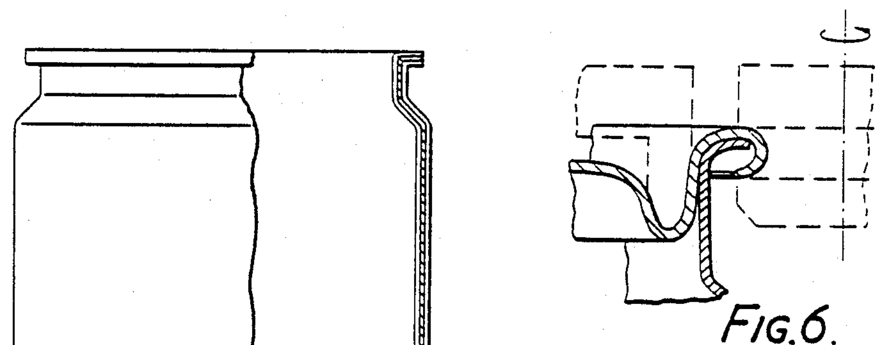
FIG. 5.
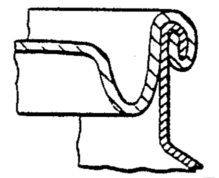
FIG. 6.
FIG. 7.

LAMINATES OF POLYOLEFIN-BASED FILM AND METAL AND PROCESSES FOR PRODUCING SUCH LAMINATES

BACKGROUND

This invention relates to laminated materials comprising a polyolefin-based film bonded to a surface of a metal sheet.

Polyolefin coated metal strip has been used for various purposes and has a number of useful properties, but the previously available material has significant limitations as a material for making cans and can ends. In particular, coatings of polypropylene and polyethylene are relatively soft as compared with the lacquers conventionally used for coating can ends. As a result, polyolefin coatings tend to fibrillate during the conventional double seaming of a can end to a can body. The result is unsightly and renders the coating ineffective for protecting the metal of the can end.

OBJECT AND SUMMARY OF PREFERRED FORMS OF INVENTION

An object of the present invention is to provide a laminated material comprising a polyolefin-based film bonded to a metal sheet which will not be subject to this disadvantage, while retaining the known useful properties of such materials.

According to the present invention, in a laminated material comprising a polyolefin-based film bonded to one major surface of a metal sheet, the polyolefin-based film (B) is a multi-layer co-extruded film comprising an inner layer (B1) of a bonding resin which is an acid-modified polyolefin resin containing carboxyl or anhydride groups and an outer layer (B2) of a polyolefin or a polyamide containing 0.15% to 0.5% by weight of a finely divided non-reactive low-opacity synthetic silica having an average particle size in the range of 0.5 to 5 microns. The term "non-reactive" is used herein to indicate that the silica does not react with the other materials of the laminate, i.e. the polyolefin or polyamide and the metal.

It has been surprisingly found that the addition of such small quantities of synthetic silica, with an average particle size of 0.5 to 5 microns, produces a marked improvement in the performance of the material, when formed into can ends and double seamed to a can body, without affecting the appearance of the coating or its adhesion to the metal. It is of course known to incorporate inorganic pigments into polyolefin coatings, but these pigments are used in much greater amounts and are not found to have any effect in improving the performance of the coatings during double seaming. Addition of small quantities of inorganic materials such as silica to polypropylene films is also well known for the purpose of reducing blocking, but these films have not been employed in forming laminates with metal strip, and it is surprising that such additions can enhance the performance of the coating in double seaming since it has been found that comparable organic slip agents have no such beneficial effect.

Preferably the outer layer (B2), if of a polyolefin, is polypropylene or an ethylene-propylene copolymer, or if of a polyamide, is nylon 6.

The bonding resin layer (B1) is an acid-modified polyolefin resin containing carboxyl or anhydride groups. Typical acids for use in preparing such acid-modified polymers are ethylenically unsaturated carboxylic acids such as acrylic acid, methacrylic acid, maleic acid, fumaric acid, crotonic acid, and itaconic acid. Typical anhydrides used for the same purpose are ethylenically unsaturated carboxylic anhydrides such as maleic anhydride.

The acid groups can be present as copolymers of ethylene, for example ethylene/acrylic acid (EAA) or ethylene/methacrylic acid (EMAA). Typically the acid concentration is 5 to 15%.

The acid modification of the acid modified polymers can be obtained, for example, by grafting maleic anhydride to a polyolefin such as polypropylene, polyethylene, ethylenepropylene or ethylene-vinylacetate copolymer. The graft can be introduced by techniques such as reacting maleic anhydride with polyolefin in solution in an organic solvent and using a free radical catalyst such as dibenzoyl peroxide or dicumyl peroxide. Alternatively, an active centre can be introduced into the polymer by using high energy radiation such as gamma rays or X-rays and then reacting the resultant material with the anhydride.

The acid modified polyolefin can be diluted with further unmodified polyolefin to produce a bonding resin preferably having a content of grafted acid (i.e. a graft level) of 0.02 to 0.6%, most preferably 0.2+0.05%, measured by analysis of infra red absorption at 1790 $cm^{-1}$, of resin pre-dried at 200° C. to convert acid functionality to anhydride functionality. The diluting unmodified polyolefin can be the same polyolefin which has been used to produce the acid modified polyolefin, or it can be a different polyolefin. Thus, for example, an acid modified low-density polyethylene (LDPE) or linear low-density polyethylene (LLDPE) can be diluted with polypropylene, or an acid modified polypropylene can be diluted with a polypropylene or an ethylene propylene random copolymer.

The purpose of the inner layer (B1) of bonding resin is to tie the outer layer (B2) of polyolefin or polyamide to the metal surface. Preferably when the outer polyolefin layer (B2) is a polypropylene homopolymer or an ethylene-propylene copolymer or nylon 6, the bonding resin base of inner tie layer (B1) is a polypropylene or an ethylene propylene random copolymer.

Preferably, for a bonding resin layer based on polypropylene, the bonding resin melt flow index is 3 to 30 gm/10 minutes, measured at 230° C. by the ASTM test No. D1238.

Particularly preferred bonding resin layers are based on random ethylene-propylene copolymers or blends of linear low-density polyethylene (LLDPE) with polypropylene.

A particularly preferred acid modified olefin copolymer is maleic-anhydride modified ethylene vinyl acetate.

The layer of bonding resin (B1) is preferably continuous and of a thickness of from 1 to 10 microns, and the outer layer (B2) is preferably of a thickness of from 10 to 500 microns.

In an alternative form of the invention, the multi-layer coextruded film (B) further comprises an intermediate layer (B3) of a polyolefin. In this case, the outer layer may be of a polyolefin, or the film may further comprise a second bonding resin layer between the intermediate layer and the outer layer which is of nylon. In another alternative the multi-layer co-extruded film further comprises an intermediate layer (B3) of a nylon and a second bonding resin layer (B4) between the intermediate layer (B3) and the outer layer (B2) which is of a polyolefin.

Preferably the laminated material has another thermoplastic polymer film (A) bonded to the other major surface of the metal sheet. This polymer film (A) is typically based on polyolefin, polyester or polyamide resins or composites of polyolefins and polyamides.

This other polymer film (A) is typically a composite polyester film comprising a thinner inner layer (A1) of a substantially non-crystalline (i.e. amorphous) linear polyester which has a softening point below 150° C. and a melting point about 150° C. but below 240° C. and a thicker outer layer (A2) having a melting point above 220° C., and preferably having an intrinsic viscosity of from 0.5 to 1.1, preferably 0.6 to 0.8. The composite polyester film (A) is preferably one which has been prepared by co-extrusion prior to application to the metal strip.

Preferably the outer layer (A2) is biaxially oriented polyester such as polyethylene terephthalate. Preferably the inner layer (A1) is a linear copolyester, for example an amorphous copolymer of approximately 80 mole % ethylene terephthalate and approximately 20 mole % ethyleneisophthalate. Copolyesters of terephthalic acid and two alcohols, for example ethylene glycol and cyclohexane-dimethanol, are also suitable for use as the inner layer (A1).

Typically, the biaxially oriented polyester in outer layer (A2) has a crystallinity greater than 30%, preferably from 40 to 50%.

The crystallinity of a polyester material can be estimated by X-ray diffraction techniques as described in GB 1566422 or from measurement of density and applying the relationship:

$$V_c=(P-Pa)\,(Pc-Pa)^{-1}$$

$V_c$=Volume fraction crystallinity
P=density of sample
$P_a$=density of amorphous material
$P_c$=density of crystalline material P can be measured in a density column using zinc chloride/water or n-heptane/carbon tetrachloride mixtures.

The biaxially oriented film which may be used as the outer layer may be formed by stretching the amorphous extruded polymer in the forward direction at temperatures above the glass transition temperature of the polymer by a factor of 2.2 to 3.8 and similarly in the transverse direction by 2.2 to 4.2. Where the laminated coating is to be used in deep drawing metal containers, the orientation is preferably limited to stretching by a factor approximately 2.5 in both forward and transverse directions.

Typically the inner layer (A1) should be continuous and have a typical thickness of about 2 to 5 microns. The thickness of the outer polyester layer (A2) is typically 10 to 25 microns and the total film thickness 12 to 30 microns.

Also, if desired, the outer polyester layer (A2) may be pigmented using conventional pigments such as titanium dioxide and toning pigments to produce either a coloured film or an acceptably white film. Such polyester films are described in our copending British Patent Application No. 8724237 filed Oct. 15, 1987.

Alternatively the thermoplastic polymer film (A) may be a polyolefin or polyolefin-polyamide composite coextruded film of the types described for film (B).

Either or both films (A) and (B) may be pigmented in one or more layers with an opaque or coloured pigment. Titanium dioxide is a suitable white pigment.

The metal substrate to which the polymer film or films are applied typically in the form of metal strip, is generally steel or aluminium or alloys thereof, typically a steel or aluminium based product used in the packaging industry.

The gauge range is typically 0.05 mm to 0.4 mm for steel and 0.02 mm to 0.4 mm for aluminium.

The steel may be coated with tin, preferably passivated by conventional chromic treatments, or alternatively may be in the form of nickel or zinc plated steel, blackplate or phosphated blackplate, which is preferably chromate rinsed after phosphating.

The preferred steel finish is electrolytically chromium coated steel (ECCS) with a dual layer of chromium metal and chromium oxide. With such steels, the chromium metal and chromium oxide levels can vary widely. Typically, the chromium metal content ranges from 0.1 to 0.20 $gm/m^2$, while the chromium oxide ranges from 0.005 to 0.05 $gm/m^2$. The ECCS is commonly derived from deposition systems containing either sulphur containing or fluorine containing catalysts.

The invention also resides in a process for producing a laminated material comprising a polyolefin-based film bonded to one major surface of a metal sheet, comprising the steps of laminating to one major surface of a metal strip a multilayer co-extruded polyolefin-based film comprising an inner layer of a bonding resin which is an acid-modified polyolefin resin containing carboxyl or 8 anhydride groups and an outer layer of a polyolefin or polyamide containing 0.15% to 0.5% by weight of a finely divided non-reactive low-opacity synthetic silica having an average particle size in the range of 0.5 to 5 microns, subjecting the laminated material to a temperature sufficient to cause the polyolefin film to bond with the metal strip, and quenching the laminated material rapidly and uniformly from above the melting point of the polyolefin to below its softening point.

Preferably another thermoplastic polymer film (A) is laminated simultaneously to the other major surface of the metal strip, e.g. a biaxially oriented polyester film as referred to above or a co-extruded polyolefin or composite polyolefin-polyamide film as described above, preferably with an inner bonding resin layer ($A^1$).

Preferably the lamination is effected by first simultaneously laminating both of the films to the metal strip with the metal strip at a temperature $T_1$ which is sufficient to cause softening of the bonding resin layers of both films but is below the temperature at which the outer surface of the film or films would be damaged during lamination, and then re-heating the resultant laminate to a temperature $T_2$ which is above the melting point of the polyolefin-based film or films. Preferably the temperature $T_1$ is in the range from 130° C. to 220° C. and the temperature $T_2$ is in the range from 220° C. to the degradation temperature of the polymer film or films.

The quenching is preferably effected by flooding the polymer coated surface or surfaces of the laminated material with cold liquid, such as water at room temperature, as described in our copending British Patent Application No. 8724244 filed Oct. 15, 1987.

The invention also resides in articles formed from the laminated material of the invention, namely a can end, a flanged can body and a can body having an end seamed thereto by a double seam.

THE DRAWINGS

Specific embodiments of the invention will now be described in more detail by way of example and with reference to the accompanying drawings in which:

FIG. 1 is a sectioned side elevation of a laminate comprising two layers of polymer on a metal strip, FIG. 2 is a sectioned side elevation of a laminate comprising four layers of polymer on a metal strip, FIG. 3 is a sectioned side elevation of a laminate comprising a pair of polymer layers on each side of a metal strip, FIG. 4 is a sectioned side elevation of a can end having an aperture therein closed by a plastics plug, FIG. 5 is a part sectioned sketch of a side view of a drawn and wall ironed beverage can, FIG. 6 is a fragmentary section of the can end of FIG. 4 during a first operation of double seaming to the flange of the can of FIG. 5 and rolls/chuck used for this operation, FIG. 7 is a like view to FIG. 6 showing a double seam after a second rolling operation, FIG. 8 is a side elevation of a drawn/redrawn can having a stacking feature formed by roll forming between an internal mandrel and a profiled external rail, and FIG. 9 is a side view of a can body having a welded side seam and clusters of annular beads in the side wall formed by rolling.

DETAILED DESCRIPTION

It will be understood by those in the art that a material used for making cans, and other formed articles, must be able to survive several forming processes such as blanking, drawing, redrawing and perhaps wall ironing. Can flanges and the peripheral cover hooks of can ends also have to survive folding to tight bends by seaming rolls. The laminates of FIGS. 1 to 3 contain additions of inorganic filler to their outer layer in accordance with the invention in order to enable them to survive these processes.

EXAMPLES

Examples 1 to 9 describe laminates of polypropylene coatings to ECCS. The material formulations are set out in Table 1 and lamination conditions in Table 2. The invention is illustrated by Examples 2, 3, 4, 7 and 8. Examples 1, 5, 6 and 9 are for comparison.

The laminates in Examples 1 to 9 were examined visually. Laminates in Examples 2 to 5 containing synthetic silica were glossy and clear like the unpigmented material (Example 1). By contrast the laminate of Example 9 containing high opacity pigment at a similar concentration was a grey-blue colour at the film thicknesses necessary for can end stock.

The presence of synthetic silica did not mar or change the appearance of white coatings; Example 7 was visually identical to comparative Example 6.

When formed into 65 mm diameter easy-open beverage can ends as shown in FIG. 5, the laminate of Example 8 gave excellent metal protection, with no loss of coverage in forming the end detectable by the widely understood "enamel rating" technique. (The ends gave current readings averaging less than 0.1 milliampere).

Figure 8:
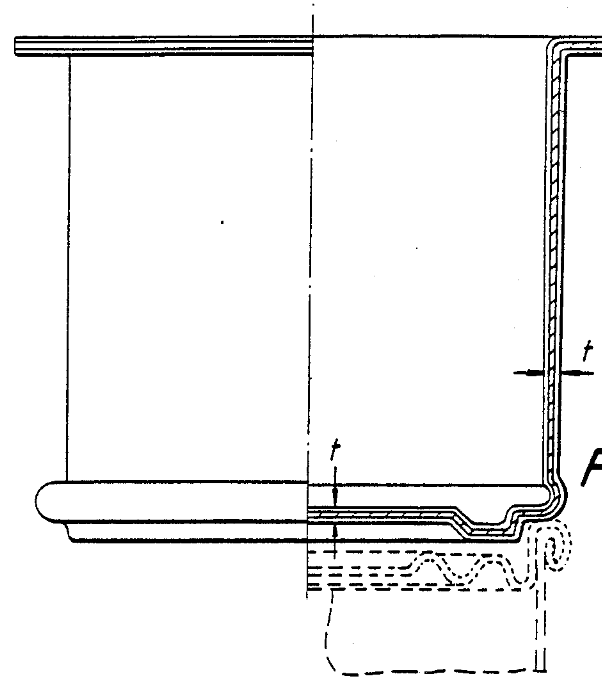
Figure 9:
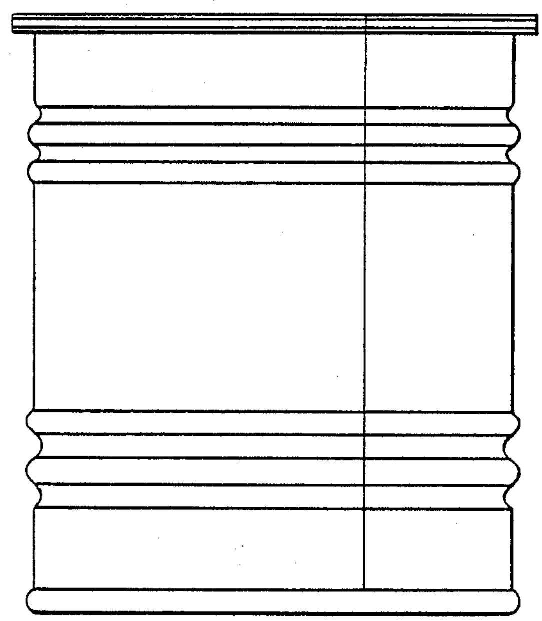

Laminates of Examples 1 to 5 and 10 were formed into 73 mm diameter non-easy open food can ends, such as sketched in dashed lines in FIG. 8. The ends were seamed on to welded can bodies such as shown in FIGS. 8 and 9 using conventional double seaming equipment as described with reference to FIG. 6. The ends were examined after double seaming for coating damage.

EXAMPLE 1

Coating fibrillation and scuffing on the seaming panel and rim. Some metal exposed on the reverse wall of the seaming panel.

EXAMPLES 2 to 4

Very little disturbance of the coating. Occasional spots of exposed metal on the rim.

EXAMPLE 5

Coating fibrillation and scuffing on the seaming panel and rim. Some metal exposed on the reverse wall of the seaming panel.

EXAMPLE 10

Coating fibrillation and scuffing on the seaming panel and rim. Some metal exposed on the reverse wall of the seaming panel.

The Examples show that the silica materials of the invention have little effect on appearance but markedly improve the coating's behaviour in double seaming. By contrast high opacity coating pigments are not desirable at such low concentrations and do no improve the seaming performance.

It is surprising the inorganic silica material had such a beneficial effect when organic slip agent, expected to lubricate the seaming operation, reversed the effect of the inorganic material.

TABLE 1

| Material | Film B | Film A | Metal |
|---|---|---|---|
| 1 | Bond Resin (2μ) Polypropylene (18μ) | Bond Resin (2μ) Polypropylene (18μ) | 0.21 mm ECCS 450 N/mm² |
| 2 | As 1B but with 0.15% synthetic silica | As 1A | As 1 |
| 3 | As 1B but with 0.3% synthetic silica | As 1A | As 1 |
| 4 | As 1B but with 0.5% synthetic silica | As 1A | As 1 |
| 5 | As 2B but with organic slip agent | As 1A | As 1 |
| 6 | Bond Resin (3μ) Polypropylene containing 20% titanium dioxide (29μ) Bond Resin (3μ) Nylon 6 containing 6% titanium dioxide (5μ) | Bond Resin (3μ) Polypropylene (37μ) | As 1 |
| 7 | As 6B but with 0.5% synthetic silica in the nylon layer | As 6A | As 1 |
| 8 | Bond Resin (3μ) Polypropylene with 0.5% synthetic silica (37μ) | PET (15μ) | 0.24 mm ECCS 550 N/mm² |
| 9 | Bond Resin (3μ) Polypropylene with 0.5% titanium dioxide (37μ) | PET (15μ) | 0.24 mm ECCS 550 N/mm² |
| 10 | As 1B but 3% titanium dioxide in | As 1A | As 1 |

TABLE 1-continued

| Material | Film B | Film A | Metal |
|---|---|---|---|
| | the Polypropylene | | |

Note:
1. Bond Resin is a maleic anhydride modified polypropylene containing 0.2 + 0.05% maleic anhydride.
2. PET is a co-extruded biaxially oriented film with an inner layer of a copolymer of ethylene terephthalate and ethylene isophthalate and an outer layer of PET.
3. The organic slip agent contained amide groups and is a material conventionally used for increasing the slip behaviour of polypropylene film.
4. Synthetic silica particle size 2 to 5 micron average.
5. Titanium dioxide particle size 0.2 to 0.5 micron average.

TABLE 2

| Material | T1 (°C.) | T2 (°C.) | Coating Appearance (Coating B) |
|---|---|---|---|
| 1 | 140 | 250 | Glossy, clear |
| 2 | 140 | 250 | Glossy, clear |
| 3 | 140 | 250 | Glossy, clear |
| 4 | 140 | 250 | Glossy, clear |
| 5 | 140 | 250 | Glossy, clear |
| 6 | 155 | 250 | White |
| 7 | 155 | 250 | White |
| 8 | 155 | 250 | Glossy, clear |
| 9 | 155 | 250 | Grey-blue appearance |

The laminates were quenched according to our co-pending British Patent Application No. 8724244 filed Oct. 15, 1987, to which reference is made for details of process. In that process, the films A and B are laminated simultaneously to the metal strip with the metal strip at a temperature $T_1$, generally in the range from 130° C. to 220° C., which is sufficient to cause softening of the bonding resin layers of both films but is below the temperature at which the outer surface of the films would be damaged during lamination. The resultant laminate is then re-heated to a temperature $T_2$, generally in the range from 220° C. to the degradation temperature of the polymer films, which is above the melting point of the polymer films and sufficient to cause the films to bond with the metal strip. Finally the laminated material is quenched rapidly and uniformly from above the melting point of the films to below their softening point, by flooding the polymer coated surfaces with cold liquid, e.g. water at room temperature.

I claim:

1. A laminated material comprising a polyolefin based film bonded to one major surface of a metal sheet, characterised in that the polyolefin-based film is a multi-layer co-extruded film comprising an inner layer of a bonding resin which is an acid-modified polyolefin resin containing carboxyl or anhydride groups and an outer layer of a polyolefin or a polyamide containing 0.15% to 0.5% by weight of a finely divided non-reactive low-opacity synthetic silica having an average particle size in the range of 0.5 to 5 microns.

2. A laminated material according to claim 1 characterised in that the bonding resin is chosen from a maleic anhydride modified polypropylene, maleic anhydride modified ethylene-propylene copolymer, maleic anhydride modified polyethylene, or a maleic anhydride modified ethylene vinyl acetate.

3. A laminated material according to claim 1 characterised in that the outer layer comprises a polypropylene or ethylene-propylene copolymer.

4. A laminated material according to claim 1, characterised in that the outer layer comprises nylon 6.

5. A laminated material according to claim 1 characterised in that the multi-layer co-extruded film further comprises an intermediate layer of a polyolefin.

6. A laminated material according to claim 5 characterised in that the outer layer comprises a polyolefin.

7. A laminated material according to claim 5 characterised in that the film further comprises a second bonding resin layer between the intermediate layer and the outer layer which comprises nylon.

8. A laminated material according to claim 1, characterised in that the multi-layer co-extruded film further comprises an intermediate layer of a nylon and a second bonding resin layer between the intermediate layer and the outer layer, which comprises a polyolefin.

9. A laminated material according to claim 1 characterised by having another thermoplastic polymer film bonded to the other major surface of the metal sheet.

10. A laminated material according to claim 1 characterised in that the metal sheet is of electrolytically chromium coated steel with a dual layer of chromium metal and chromium oxide.

11. A can end characterised in that it is formed from a laminated material as defined in claim 1.

12. A flanged can body characterised in that it is formed from a laminated material as defined in claim 1.

13. A can body having an end secured thereto by a double seam, characterised in that both the can body and the can end being formed from a laminated material as defined in claim 1.

14. A process for producing a laminated material comprising a polyolefin-based film bonded to one major surface of a metal sheet, characterised by the steps of:

laminating to one major surface of a metal strip a multi-layer co-extruded polyolefin-based film comprising an inner layer of a bonding resin which is an acid-modified polyolefin resin containing carboxyl or anhydride groups and an outer layer of a polyolefin or polyamide containing 0.15% to 0.5% by weight of a finely divided non-reactive low-opacity synthetic silica having an average particle size in the range of 0.5 to 5 microns, subjecting the laminated material to a temperature sufficient to cause the polyolefin film to bond with the metal strip, and quenching the laminated material rapidly and uniformly from above the melting point of the polyolefin to below its softening point.

15. A process according to claim 14 characterised in that the bonding resin is chosen from a maleic anhydride modified polypropylene, maleic anhydride modified ethylene-propylene copolymer, maleic anhydride modified polyethylene, or a maleic anhydride modified ethylene vinyl acetate.

16. A process according to claim 14 characterised in that the outer layer comprises a polypropylene or ethylene-propylene copolymer.

17. A process according to claim 14 characterised in that the outer layer comprises nylon 6.

18. A process according to claim 14 characterised in that another thermoplastic polymer film is laminated simultaneously to the other major surface of the metal strip.

19. A process according to claim 18 characterised in that the other polymer film is a composite polyolefin or polyolefin-polyamide film with an inner bonding resin layer.

20. A process according to claim 19 characterised in that the lamination is effected by first simultaneously laminating both of the films to the metal strip with the metal strip at a temperature $T_1$ which is sufficient to cause softening of the bonding resin layers of both films but is below the temperature at which the outer surface of the films would be damaged during lamination, and then re-heating the resultant laminate to a temperature $T_2$ which is above the melting point of the polyolefin-based film or films.

21. A process according to claim 20 characterised in that the temperature $T_1$ is in the range from 130° C. to 22° C. and the temperature $T_2$ is in the range from 220° C. to the degradation temperature of the polymer film or films.

22. A process according to claim 14, characterised in that the quenching is effected by flooding the polymer coated surface or surfaces of the laminated material with cold liquid.

23. A process according to claim 22 characterised in that the cold liquid is water at room temperature.

* * * * *